(12) United States Patent
Wang et al.

(10) Patent No.: US 10,409,569 B1
(45) Date of Patent: Sep. 10, 2019

(54) AUTOMATIC SOFTWARE PERFORMANCE OPTIMIZATION

(71) Applicant: Snap Inc., Venice, CA (US)

(72) Inventors: Guohui Wang, Los Angeles, CA (US); Fenglei Tian, Los Angeles, CA (US); Samuel Edward Hare, Pacific Palisades, CA (US); Sumant Hanumante, Marina Del Rey, CA (US); Tony Mathew, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 62 days.

(21) Appl. No.: 15/859,004

(22) Filed: Dec. 29, 2017

Related U.S. Application Data

(60) Provisional application No. 62/579,696, filed on Oct. 31, 2017.

(51) Int. Cl.
| | | |
|---|---|---|
| *G06F 9/44* | (2018.01) | |
| *G06F 8/41* | (2018.01) | |
| *G06N 3/04* | (2006.01) | |
| *G06F 9/50* | (2006.01) | |

(52) U.S. Cl.
CPC .............. *G06F 8/443* (2013.01); *G06F 9/505* (2013.01); *G06N 3/04* (2013.01)

(58) Field of Classification Search
None
See application file for complete search history.

(56) References Cited

U.S. PATENT DOCUMENTS

2017/0185922 A1* 6/2017 Lange .................... G06N 20/00

* cited by examiner

*Primary Examiner* — Qamrun Nahar
(74) *Attorney, Agent, or Firm* — Schwegman Lundberg & Woessner, P.A.

(57) ABSTRACT

Among other things, embodiments of the present disclosure improve the functionality of computer software and systems by facilitating the automatic performance optimization of a software application based on the particular platform upon which the application runs. In some embodiments, the system can automatically choose a set of parameters or methods at run-time from a design space with pre-selected optimization methods and parameters (e.g., algorithms, software libraries, and/or hardware accelerators) for a specific task.

20 Claims, 13 Drawing Sheets

| Layer # | SGEMM size |
|---|---|
| 1 | $(M, K, N)_1$ |
| 2 | $(M, K, N)_2$ |
| 3 | $(M, K, N)_1$ |
| 4 | $(M, K, N)_3$ |
| 5 | $(M, K, N)_4$ |
| 6 | $(M, K, N)_2$ |
| 7 | $(M, K, N)_3$ |
| 8 | $(M, K, N)_5$ |
| 9 | $(M, K, N)_1$ |
| 10 | $(M, K, N)_3$ |

FIG. 5E

| SGEMM size | Layer index # | 1st pass (1st image frame) | | | 2nd pass (2nd image frame) | | | 3rd pass (3rd image frame) | | |
|---|---|---|---|---|---|---|---|---|---|---|
| $(M,K,N)_1$ | 1,3,9 | A | B | A | B | A | B | A | B | A |
| $(M,K,N)_2$ | 2,6 | A | B |   | A | B |   | A | B |   |
| $(M,K,N)_3$ | 4,7,10 | A | B | A | B | A | B | A | B | A |
| $(M,K,N)_4$ | 5 | A |   |   | B |   |   | A |   |   |
| $(M,K,N)_5$ | 8 | A |   |   | B |   |   | A |   |   |

FIG. 5F

| SGEMM size | Layer index # | Our choice |
|---|---|---|
| $(M,K,N)_1$ | 1,3,9 | A |
| $(M,K,N)_2$ | 2,6 | A |
| $(M,K,N)_3$ | 4,7,10 | B |
| $(M,K,N)_4$ | 5 | B |
| $(M,K,N)_5$ | 8 | A |

FIG. 5G

AUTOMATIC SOFTWARE PERFORMANCE OPTIMIZATION

PRIORITY

This application claims the benefit of priority to U.S. Provisional Patent Application Ser. No. 62/579,696, filed on Oct. 31, 2017, which is hereby incorporated by reference herein in its entirety

BACKGROUND

As mobile devices become more powerful with the advance of the mobile system-on-chip (SoC) chipsets and modern sensor technologies, the complexity of various software applications running on such devices has increased as well. For example, computer vision algorithms (including deep learning based computer vision algorithms) are often deployed on mobile devices to power a wide range of applications such as image editing, augmented reality, games and so on. Deep learning applications, for instance, have been widely used to many computer vision problems such as image classification, object detection, semantic segmentation and others.

However, with the limited computation resources and strict power constraints of many mobile computing devices, performance is still a major bottleneck which prevents or limits the advanced deep learning-based computer vision algorithms from being deployed on such mobile devices. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 5A-5G are diagrams and tables illustrating the functionality of various exemplary embodiments of the disclosure.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of computer software and systems by facilitating the automatic performance optimization of a software application based on the particular platform upon which the application runs. In some embodiments, the system can automatically choose a set of parameters or methods at run-time from a design space with pre-selected optimization methods and parameters (e.g., algorithms, software libraries, and/or hardware accelerators) for a specific task.

Figure 1:
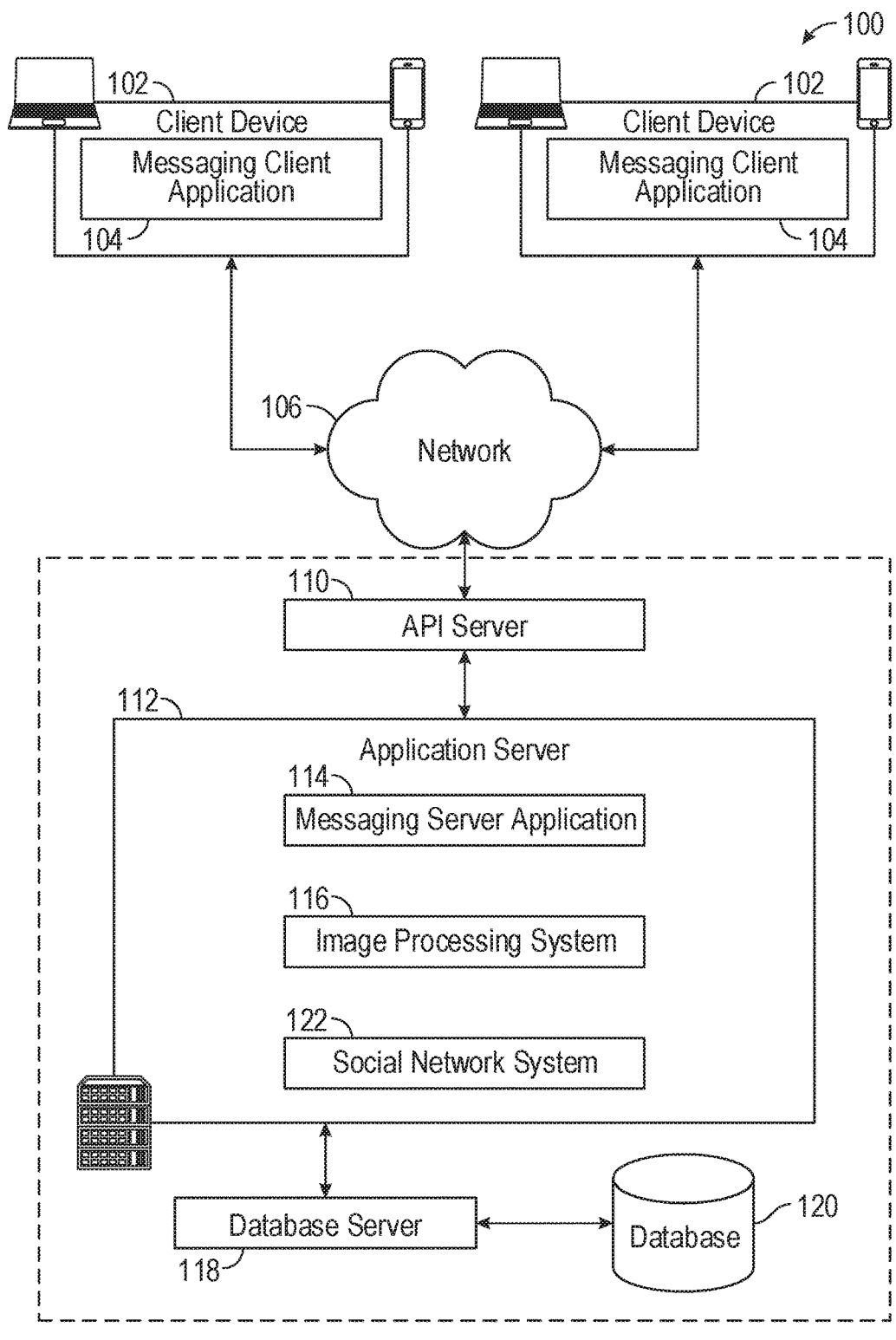
FIG. 1 is a block diagram showing an example messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of electronic media files (e.g., electronic images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to electronic images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

Figure 2:
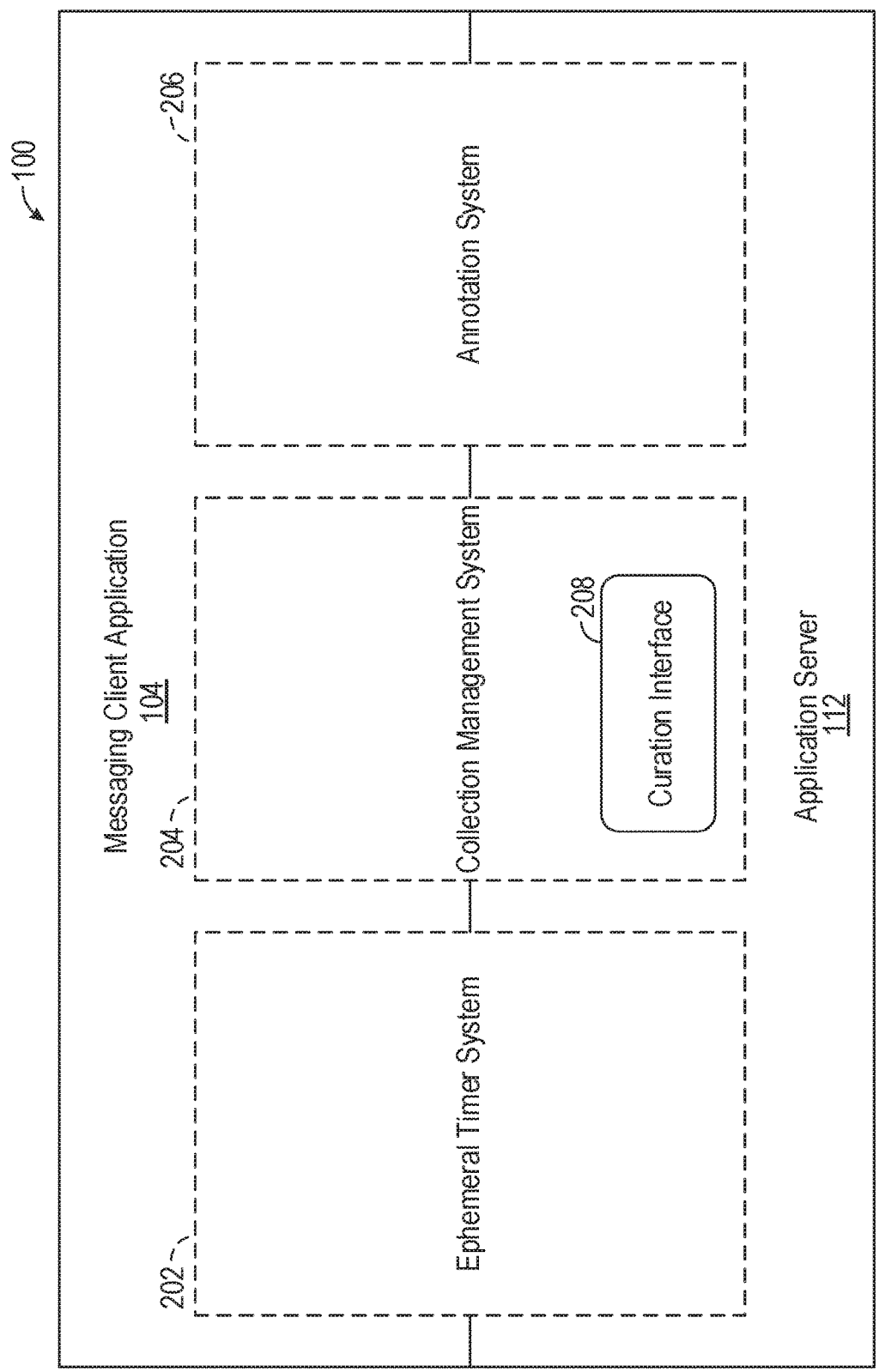
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., which may be referred to herein as a "story"), selectively display and enable access to messages and associated content via the messaging client application 104.

The collection management system 204 is responsible for managing collections of media (e.g., collections of text, image, video and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a "filter") to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 102. For example, the media overlay including text that can be overlaid on top of a photograph/electronic image generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some exemplary embodiments, embodiments of the present disclosure may generate, display, distribute, and apply media overlays to media content items. For example, embodiments may utilize media content items generated by a client device 102 (e.g., an image or video captured using a digital camera coupled to the client device 102) to generate media overlays that can be applied to other media content items.

Figure 3:
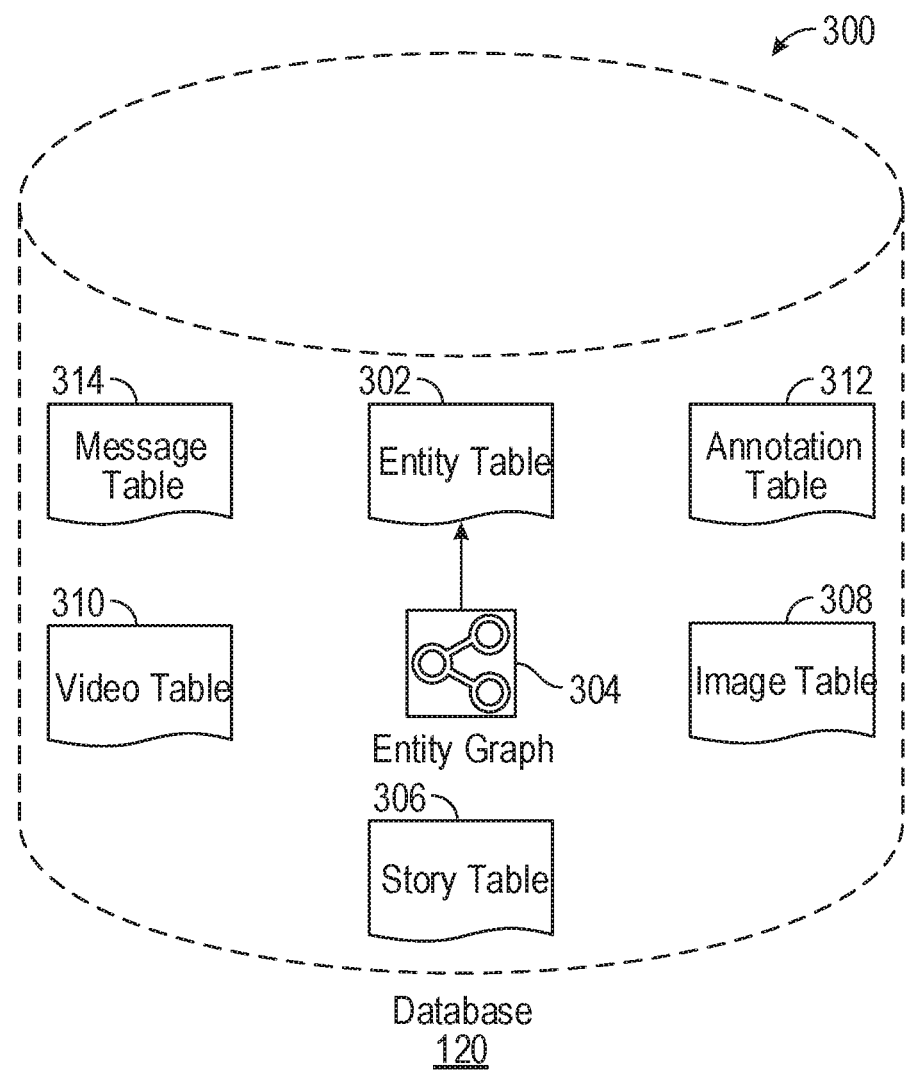
FIG. 3 is a schematic diagram illustrating data which may be stored in the database of the messaging server system, according to various exemplary embodiments.

FIG. 3 is a schematic diagram 300 illustrating data 300 that is stored in the database 120 of the messaging server system 108, according to certain exemplary embodiments.

While the content of the database 120 is shown to comprise a number of tables, the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message.

Other types of filters include geolocation filters (also known as Geofilters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time. Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a "story" or a "gallery"). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages/communications such as short message service (SMS) or multimedia message service (MMS) texts and emails. The customized images may also be utilized in conjunction with the stories, filters, and ephemeral messaging functionality discussed herein.

In some embodiments, the media content item generated or used by the system may be included in a media overlay such as a "sticker" (i.e., an image that can be overlaid onto other images), filter (discussed above), or another media overlay. Such overlays may include static (i.e., non-moving) features as well as dynamic (i.e., moving) features. Generation of media content items by embodiments of the present disclosure may include the generation of one or more data structure fields containing information regarding the content item. For example, the system may generate a name field in a data structure for the media overlay that includes a name for the media content item received from the content provider.

Embodiments of the present disclosure may transmit and receive electronic communications containing media content items, media overlays, or other content any form of electronic communication, such as SMS texts, MMS texts, emails, and other communications. Media content items included in such communications may be provided as attachments, displayed inline in the message, within media overlays, or conveyed in any other suitable manner.

Embodiments of the present disclosure may optimize the performance of a software application based on a variety of different factors, such as system hardware architecture, software configuration, environmental conditions, and others. In some cases, software applications and components thereof may be adapted to run on multiple platforms. Such platforms might include different chipsets, operating systems, system drivers, form factors etc. Furthermore, all such factors can change from time to time. Embodiments of the present disclosure may provide a dynamic and adaptive system for automatically tuning the performance of a software application, which can deliver optimal performance over predefined optimization parameters without additional cost—regardless of conditions and system changes. In some embodiments, the system automatically chooses a set of parameters or methods at run-time from a design space with pre-selected optimization methods and parameters (algorithms, software libraries, hardware accelerators, and others) for a specific task.

Figure 4:
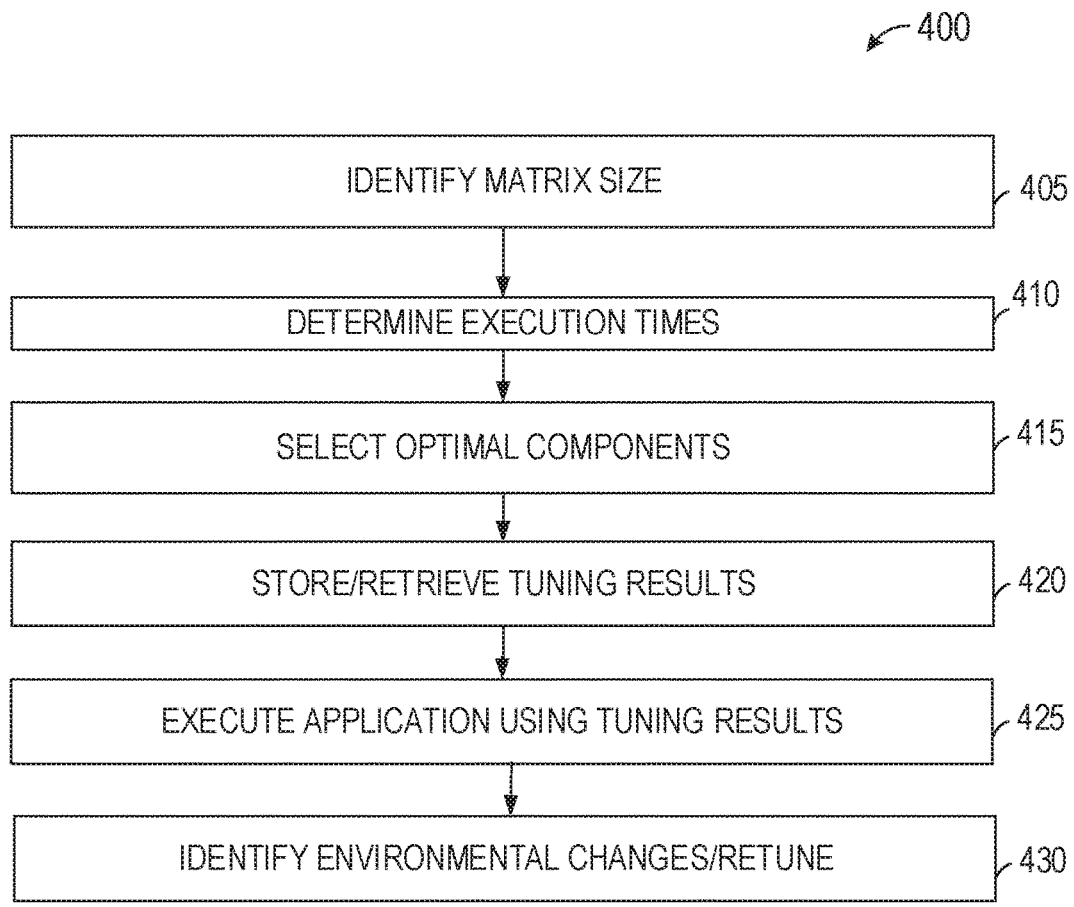
FIG. 4 is a flow diagram of an exemplary process according to various aspects of the disclosure.

FIG. 4 depicts an exemplary process according to various aspects of the present disclosure. The steps of method 400 may be performed in whole or in part, may be performed in conjunction each other as well as with some or all of the steps in other methods, may be performed any number of times and in any order, and may be performed by any number of different systems, such as the systems described in FIGS. 1 and 7. In this example, method 400 includes identifying a respective matrix size for each computing layer in a plurality of computing layers of a neural network (405), determining a time to execute software components in conjunction with computing layers (410), selecting, based on the determined times, one or more optimal software components to execute (415), storing and retrieving tuning results (420), executing a software application using the tuning results (425), and identifying an environmental change to a system and retuning in response to the identified change (430).

Given the variety of existing mobile systems, hardware configurations, system drivers, it is often difficult to select a single set of parameters that can achieve optimal performance of an application on every platform. Embodiments of the present disclosure may be utilized to perform automatic performance tuning based hardware, software, data size, layout and runtime condition. Different hardware architectures can be supported including but not limited to CPU, GPU. DSP and application-specific processors. Cross-platform implementations are supported on platforms such as iOS, Android, Linux and windows. In this disclosure, examples of the may be demonstrated with reference to a "deep learning inference" application, but embodiments of the disclosure may be used with any of a variety of different applications.

Figure 5A:
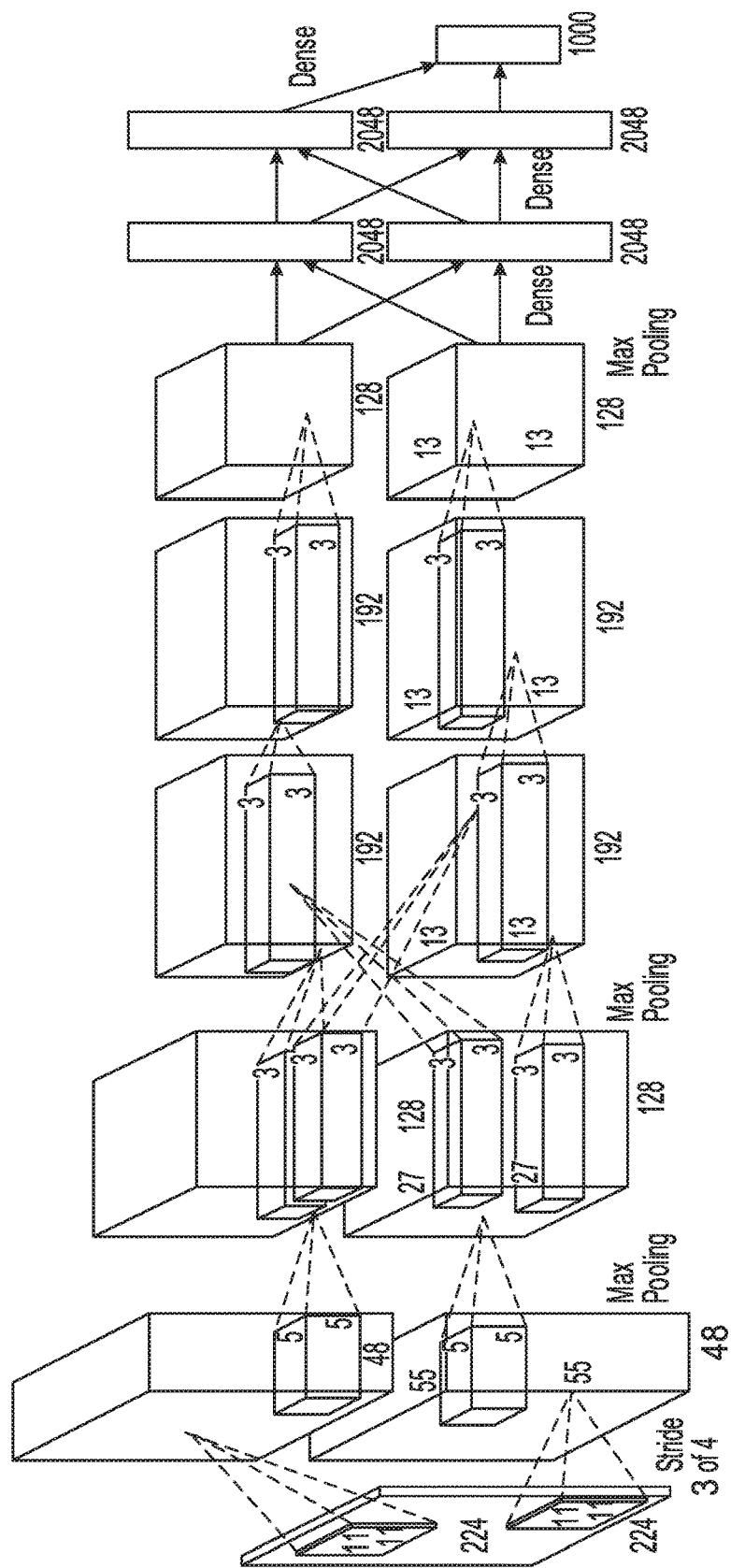

In a typical inference system for a deep neural network, input data is fed into a forward pass pipeline which includes a series of computing layers. A typical convolutional neural network (CNN) such as AlexNet shown in FIG. 5A contains image convolution layers, pooling layers, nonlinear operations, softmax and others. The core of a CNN is convolution layers. Most of the computation time is spent on convolution layers, so the system may focus on optimizing the computation of convolution layers.

The convolution layer may be implemented in different ways, such as direct convolution, and matrix multiplication. Each implementation may have advantages and disadvantages based on, for example, the size of convolution kernels, and the input tensor dimension and data storage methods on the devices being different in different network architecture. In many cases, therefore, it is often infeasible for a fixed CNN inference engine to provide optimal performance for different machine learning models, network architectures, and system platforms. Moreover, even if a matrix multiplication method is utilized, there may exist many implementations of matrix multiplication (such as direct matrix multiplication, Strassen algorithm, and parallel matrix multiplication), so the system may need to determine which implementations to use to achieve better performance. Similarly, the system may need to choose from among a variety of different libraries. For example, with regards to off-the-shelf math libraries, the system may choose one from many options, such as OpenBLAS, Eigen, Blaze, QSML, NNPack and others.

Embodiments of the disclosure can base an optimization of an application based on the hardware architecture of a platform, and can select different hardware components to run the application, including the processors and accelerators the application will utilize. For example, on a modern smart phone, the system may run math algorithms on a CPU, GPU, DSP or some application-specific hardware. Given such a large design space with many optimization parameters, generating a fixed pipeline and still achieving optimal performance under different system configurations is challenging. Instead, embodiments of the present disclosure performs an automatic performance optimization method to provide a dynamic solution.

Figure 5B:
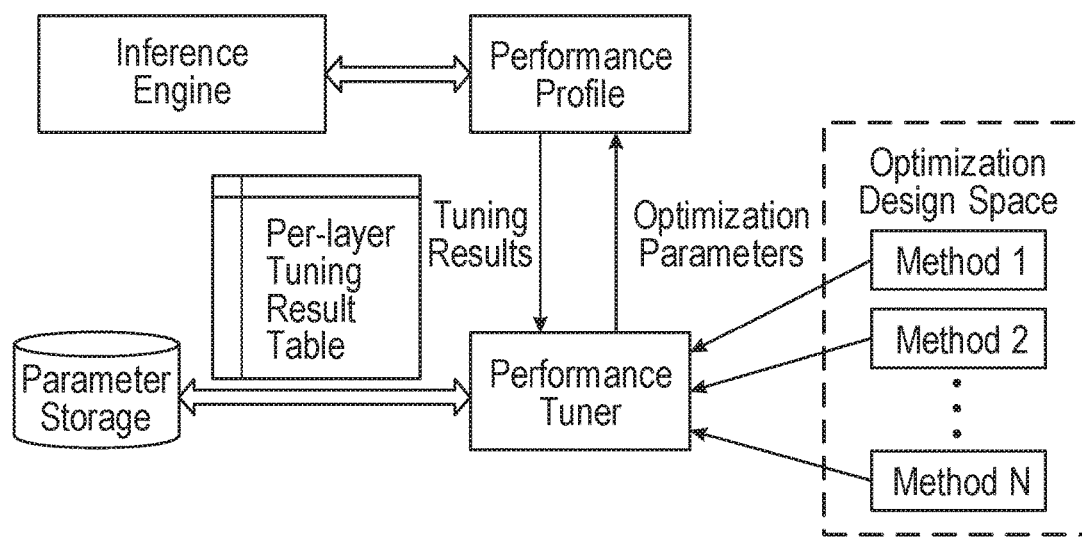

The automatic performance optimization methods of the present disclosure may include one or more of the following features: (1) multi-level performance tuning scheme(s); (2) automatic run-time performance tuning; and (3) automatic re-tuning. FIG. 5B is a block diagram illustrating various aspects of the disclosure. In this example, assume an optimization design space containing many candidate design parameters or choices, each of which can possibly generate different performance results on different platforms. The system embeds a very lightweight performance profiler into the inference engine. The performance tuner will check the optimization design space and choose a set of parameters based on a predefined optimization strategy.

Using this set of parameters, the performance profiler may collect data, such as determining execution times (410) and other performance results when the inference engine (and profile component) is running and then feed back the results into the performance tuner for selecting optimal components (415) for tuning the inference engine application.

The system (e.g., via the performance tuner) may store (420) a variety of information associated with the execution of software components (e.g., in conjunction with different computing layers and sizes). For example the system may store tuning results in a memory coupled to the system performing the tuning and/or in a database in communication with the system. In some embodiments, for example, the system may store intermediate performance results in a local table, perform an analysis, and then summarize the intermediate result into a tuning result table. The tuning process may run any number of times (e.g., defined and managed by the tuning strategy) and finalize the tuning result table which contains a set of parameters to configure the inference engine. Once the tuning process is done, all the following inference processes can directly load/retrieve (420) the pre-tuned configured parameters and execute the inference application (425) for optimal performance.

The automatic performance tuning methods of the present disclosure can help guarantee that the inference engine achieves optimal performance for a variety of different situations including, for example, different CNN models, different network architectures, mobile devices with different hardware configurations and system software versions, varying workloads on a device, and a varying temperature of the device.

In some embodiments, a profiling component may be embedded in the normal processing pipeline to evaluate the performance of a particular software application. In some cases, the profiling component may be run multiple times and each time the system collects data and chooses or adjusts the parameters to help select (415) an optimal solution. The profiling component may be run at run-time in the real environment upon which the application runs. Among other things, this helps embodiments of the present disclosure to achieve optimal performance on different devices under different conditions.

In some embodiments, data may be collected, parameters chosen/adjusted, and the application tuned during the normal execution process, thus eliminating the need for an additional tuning stage and saving overhead costs from the tuning. Additionally, in some embodiments, multi-level tuning schemes ranging from coarse-grain tuning to fine-grain tuning may be employed, allowing the system to choose among different levels of implementations. The embodiments of the present disclosure provide an overall better performance than a set of predefined optimization parameters. Moreover, embodiments of the disclosure may dynamically re-tune the system based on condition changes, allowing it to adapt to a changing environment.

Embodiments of the present disclosure may support both coarse-grain performance tuning and fine-grain performance tuning, which may provide a multi-level optimization opportunity. Coarse-grain performance tuning chooses optimization configuration on the high-level framework or library level. For example, there are many deep learning inference engines available, such as Caffe2, SNPE, Tensorflow, and CoreML, each of which performs differently on different platforms. No single framework can be the best choice to support different deep learning models across different platforms. Automatic performance tuning of the present disclosure can profile each of the engine on specific device at the run-time. Based on the profiling data, the system may choose the best framework for a specific model.

Fine-grain performance tuning may be used in the automatic tuning system of the present disclosure to provide significant performance improvement. With fine-grain tuning, the best optimization method for a specific layer can be found. This is usually impossible for a predefined optimization due to the unpredictable conditions and large number of parameters in the design space. For example, it's often impossible to find a fixed set of optimization parameters for each convolution layer in a CNN inference engine, since the performance depends on the size and layout of the input/output data and the CNN model architecture. In some embodiments, by contrast, for each layer the performance tuner can choose between direct convolution algorithm and SGEMM (single-floating point generic matrix-multiplication) math methods. In addition, the system may choose different math libraries (e.g., OpenBLAS, Eigen, Blaze, QSML, ARM compute library, etc.) to perform SGEMM operations. Furthermore, even with the same math library, the system may choose different data layouts (for example, row-major vs. col-major, and transposed vs. non-transposed).

By performing per-layer fine-grain performance tuning, the system can achieve the optimal performance for each convolution layer in a CNN inference engine. Therefore, the overall performance will be significantly improved. From the hardware architecture point of view, the system may also perform architecture-aware performance tuning by taking advantage of the heterogeneous computing capability of modern mobile computing systems. For instance, a component inside many modern mobile devices is a system-on-ship (SoC) chipset including a CPU, GPU, DSP and other modules. Such heterogeneous processors may support different programming models and languages such as ARM NEON, OpenCL, Metal, HVX and so on. The automatic performance tuning of the present disclosure may evaluate different implementations based on the above architectures and choose the best implementation on a per-layer basis.

Figure 5C:
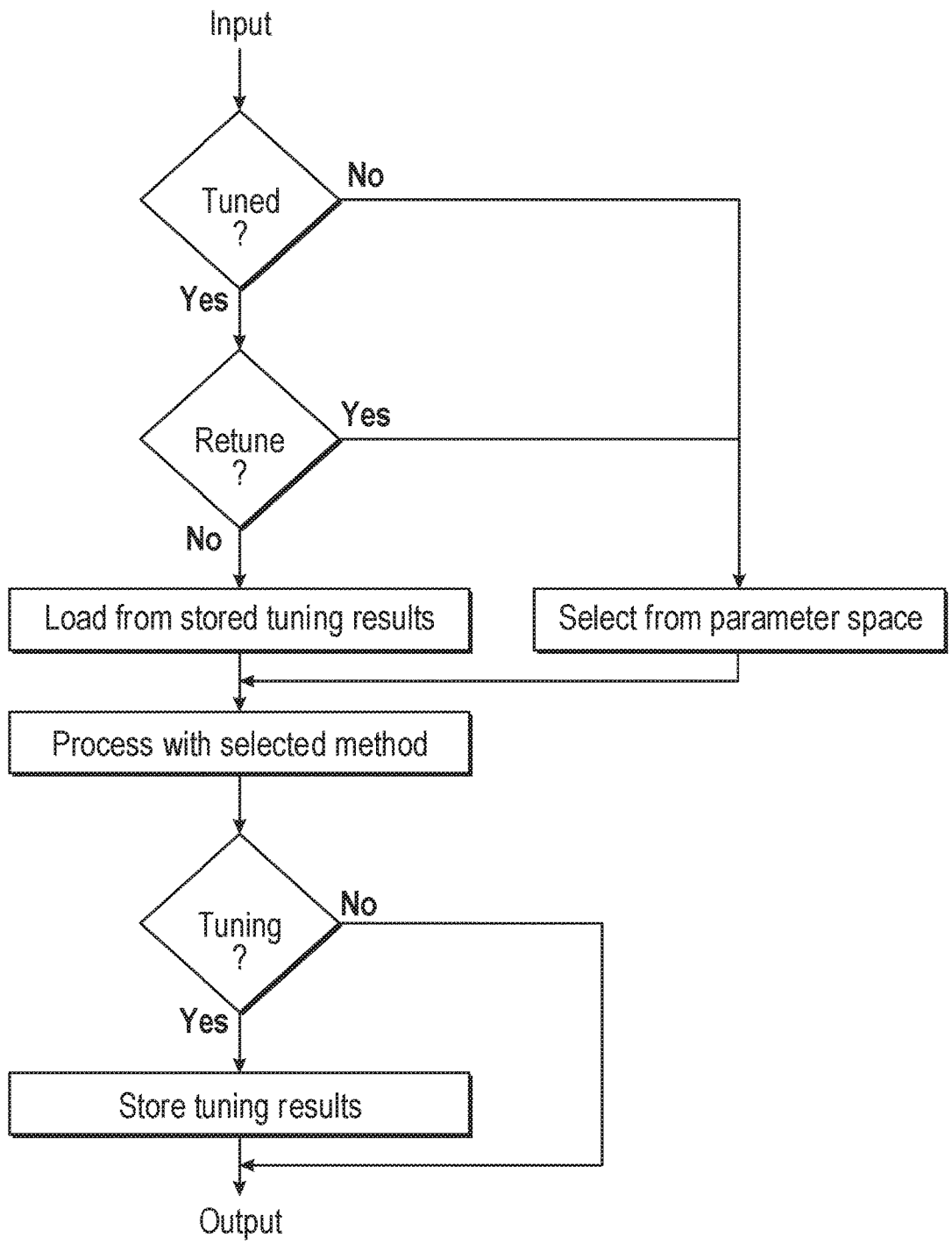

In some embodiments, the automatic performance tuning process starts when the inference engine first starts running. The system may define the number of tuning cycles in the tuning strategy (e.g. Ntune). For the first Ntune inference execution, the system may profile and evaluate different system configuration parameters. FIG. 5C is a flow diagram of an example of a tuning process according to various aspects of the disclosure. In this example, when an input comes the system first checks if it has been tuned and if retuning is needed. If the tuning is done, the performance tuner will directly load the optimized parameters/methods from the parameter storage and apply them to the inference engine. Otherwise, the performance tuner will select parameters/methods from parameter design space, apply those parameters, execute the inference, profile the performance and retrieve performance data.

The manner in which the system selects parameters and methods may depend on a variety of factors, which can be defined as a tuning strategy with the information of the property of the problems, the model types, the application use cases, how aggressive the tuner should be, and other factors. For example, in some embodiments the system may randomly choose from the candidate list to overcome the system variations, or choose in a predefined order to give every method an equal chance to be evaluated. The system may also choose parameters or methods based on the previous execution results. For example, the system may remove some algorithms which are obviously inefficient from the candidate list based on the previous tuning cycle even if the whole tuning process has not finished.

In the example shown in FIG. 5C, the process continues until the system reaches Ntune cycles, the performance tuner will analyze all the performance data, summarize the optimal parameter configurations and store the results into the parameter storage. Other than the normal computation, the system only introduces minimal profiling overhead and some logic to read, analyze and store the performance tuning results. These steps are lightweight compared to the CNN inference which is typically quite heavy, so the overhead caused by the performance tuning by embodiments of the disclosure has minimal impact the overall computation performance. In many cases, the system may only need a small number of tuning cycles to achieve very reliable tuning results. For instance, in a real-time application which runs 30 frames per second, setting Ntune to 10 only runs the tuning for the first 10 frames of input images (in a computer vision use case). In a real time system, this means the system only runs the performance tuning in the first 0.3 seconds.

One advantage of embodiments of the present disclosure running the tuning process and running process in the same path, is that the profiling for tuning will represent exactly the same condition as running. Likewise, the system is also able to detect and adjust to dynamic condition changes in the platform, which can be addressed with dynamic tuning.

In some cases, once the tuning process is finished, the following execution of the tuned software application can simply use the pre-tuned parameters generated from the tuning process. However, environmental conditions (such as battery level, device temperature and so on) and other changes to the device can have a huge impact on the performance of the application. The optimization parameters which were tuned based on a previous set of conditions may not remain optimal as those conditions change. In such cases, the system may automatically perform a dynamic tuning (also referred to as "retuning" herein) process to update the optimization methods.

The dynamic tuning may be performed in response to a variety of conditions, such as determining that a previous tuning result is outdated or the performance of the application is degraded over time. The retuning process can be initiated based on different tuning strategies such as, for example, when a condition change is detected. Additionally or alternatively, the system may schedule the retuning process at periodic intervals, thus avoiding the need for any condition checking logic.

In cases where the system checks for changes in conditions, the system may perform a variety of checks. For example, the system may detect system events associated with a computing device related to its battery level, system temperature and CPU utilization ratio to determine if there is a change in the CPU's computation capability, and initiate the retuning process accordingly. For example, the system may initiate the retuning process in response to the CPU's computation capability (or another hardware component) changing by at least a predetermined level.

Figure 5D:
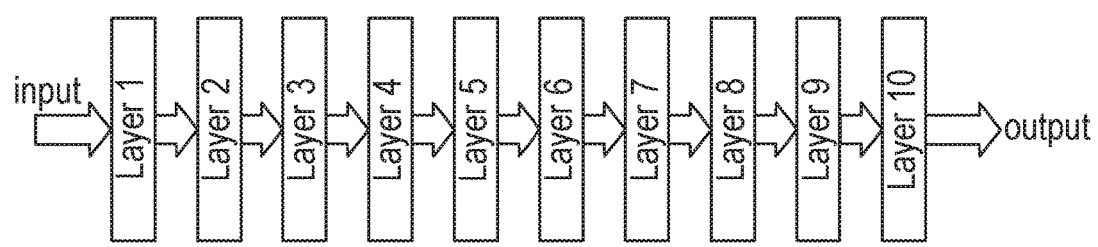

FIG. 5D is a layer diagram showing an example of a network with ten layers. In this example, consider that the system is seeking to select the best math library to perform the matrix multiplication operations (through SGEMM) for each convolutional layer. In this example, the system chooses between Eigen and OpenBLAS math libraries. The SGEMM size is represented by (M,K, N), which means an M×K matrix multiplies a K×N matrix. The network with in FIG. 5D includes ten layers and, for simplicity of the example, only convolution layers are shown.

In some embodiments, the system identifies the matrix size (405) for each computing layer, such as the layers shown in FIG. 5D. For example, FIG. 5E depicts a table containing information for each layer in FIG. 5D, namely the SGEMM size for each layer. While SGEMM size is shown in this example, embodiments of the present disclosure may identify any other suitable matrix size and type. For example, in addition to single-precision (SGEMM), other generalized matrix-vector multiplication (GEMM) types/sizes that may be used in conjunction with embodiments of the present disclosure include half-precision (HGEMM), double-precision (DGEMM), complex-precision (CGEMM), and complex double-precision (ZGEMM).

The system may store/retrieve tuning results and other information using a variety of different tuning results data structures. In the example shown in FIG. 5E, the system stores tuning results in a tabular data structure format which profiles each unique SGEMM size (M,K, N) combination and allows the system to select (415) the best math library for the specific SGEMM size. Since there are some duplicated layers in the table shown in FIG. 5E, the information in FIG. 5E may be combined and represented in the table shown in FIG. 5F. In the table shown in FIG. 5F, method A represents the "Eigen" math library, and method B represents the "OpenBLAS" math library. As used in this context, a "method" may refer to any suitable algorithm, software component (such as a software library as in the preceding example) and/or set of software settings/parameters that may be selected (415) for optimal tuning of a software application. This table thus includes an entry for each matrix size, identifies the computing layers having each matrix size, and identifies the software component ("method") tested for each pass/iteration of the test. The first pass of the first SGEMM size in the table, for example, runs component A twice and component B once.

The system may repeat execution of some or all of an application's functionality in conjunction with the same or different combinations of methods to help verify timing results and other performance information. In this example, when the program starts the CNN engine starts to run and performance tuning is performed for the first 3 frames, though more or fewer frames could be used. For the first pass, CNN engine takes the first image frame as an input. All ten layers will be executed. Selection (415) of the optimal methods/software components for each computing layer size may, as described in more detail below, be based on the respective execution times determined for each respective execution using the different software components.

Since there are 3 layers that use the same SGEMM size (M,K, N)1, SGEMM (M,K, N)1 gets 3 chances to run. For each SGEMM size, method A and method B take turns to compute the SGEMM result. Therefore, with the first input image frame, method A runs for (M,K, N)1 in layer 1, method B runs for (M,K, N)1 in layer 3, and method A runs again for (M,K, N)1 in layer 9. After each SGEMM execution, the system records the time results (410) as shown in the tuning results table depicted in FIG. 5G. This table includes an entry for each matrix size, identifies the computing layers having each matrix size, and identifies the optimal software component selected (415) for each matrix size (e.g., component A for the first and second layer size, component B for the third and fourth layer sizes, etc.).

Similarly, layer 2 and 6 use SGEMM size (M,K, N)2. For the 1st image frame, (M,K, N)2 runs twice with method A and method B, each once. The process is repeated for (M,K, N)3, (M,K, N)4 and (M,K, N)5. After the system finishes the computation for the first input image, we have the time record for all five different SGEMM sizes.

The system continues to process the second image frame and third image frame as described above, recording the time results as shown in the table in FIG. 5G. In this example, once the third image frame is done, the tuning process is finished and there are nine results for SGEMM (M,K, N)1. Five of the nine results use method A, and four of the nine results use method B. By calculating the average time, the system can compare the average time for method A and the average time for method B, then choose the smaller average time and save it in the tuning result table of FIG. 5G.

Assuming for purposes of this example that for the SGEMM (M,K, N)1, method A has a shorter time, so the system chooses method A as the preferred method for SGEMM (M,K, N)1. Although the shorter average execution time is used to identify the better method across the multiple passes/executions and among the different methods in this example, embodiments of the present disclosure may utilize any number of measurements to determine which method is better. Other such factors that may be considered include, for example, comparing the minimal time as the comparison metric; removing the largest and smallest values and computing the average of the remaining time results; computing the variation of the time results for both method A and method B. and choosing the one with the smallest variation.

Similarly, the system can determine the best methods for all other SGEMM sizes, from (M,K, N)2 to (M,K, N)5. After the system finishes determining the optimal methods for each SGEMM size, the system may provide as output a table (or other data structure) showing the best method (in this case, the best SGEMM library) for each SGEMM size (or layer index). The tuning results may be stored (430) in the memory of the computing device upon which the application runs, and may be transmitted to other systems and devices (e.g. to a server or a database for storage). In future executions of the inference application the tuning result data structure (such as the tables described above) may be retrieved and the application executed using the information in the tuning results data structure. Continuing the examples above, for instance, the tuning results table may be retrieved upon execution of the interference application and, for each layer, the optimal library (method) for the specific layer (or SGEMM size) identified and used in executing (425) the application.

For example, when layer 1 is run in the inference application, the system may retrieve the tuning results and identify method A is the best method/component to run with the interference application for the first layer. Likewise, when the inference application runs layer 4, the system identifies method B as the best method for the fourth layer.

In some embodiments, when the program is started, the system may check to determine if the performance parameters are previously tuned. If so, the system may directly load the tuning result table from memory and use it in the execution of the program. In this manner, the tuning process only needs to run once, unless the application is uninstalled and/or the tuning results are erased from memory. Additionally, performance parameters may be later updated using dynamic retuning to adjust to changes in the platform. For example, as discussed above, retuning may be performed in response to a detected change in the platform, an event, and/or at a predetermined interval. In the case of an interval-based retuning where the interval is set to be 10 seconds, every 10 seconds the system will re-start the tuning process to get a new tuning result table. In the exemplary method shown in FIG. 4, for example, the system may repeat some or all of steps 405-425 to re-determine execution times (405), re-select optimal components (410), etc. In this manner, embodiments of the present disclosure help to constantly deliver the optimal performance for an application, even if the environment or the device conditions change.

In real-world experiments using embodiments of the present disclosure, the inventors have found significant improvements over fixed-solutions. In one example, the automatic performance tuning methods of the present disclosure were applied to a deep learning model containing numerous convolution layers to choose the best SGEMM algorithm for each convolutional layer from OpenBLAS and Eigen libraries. The results showed that the automatic performance tuning methods of the present disclosure provided a significant time savings, with an execution time of 30 ms compared to an execution time of 50 ms for the OpenBLAS-only solution and 70 ms for the Eigen-only solution.

Software Architecture

Figure 6:
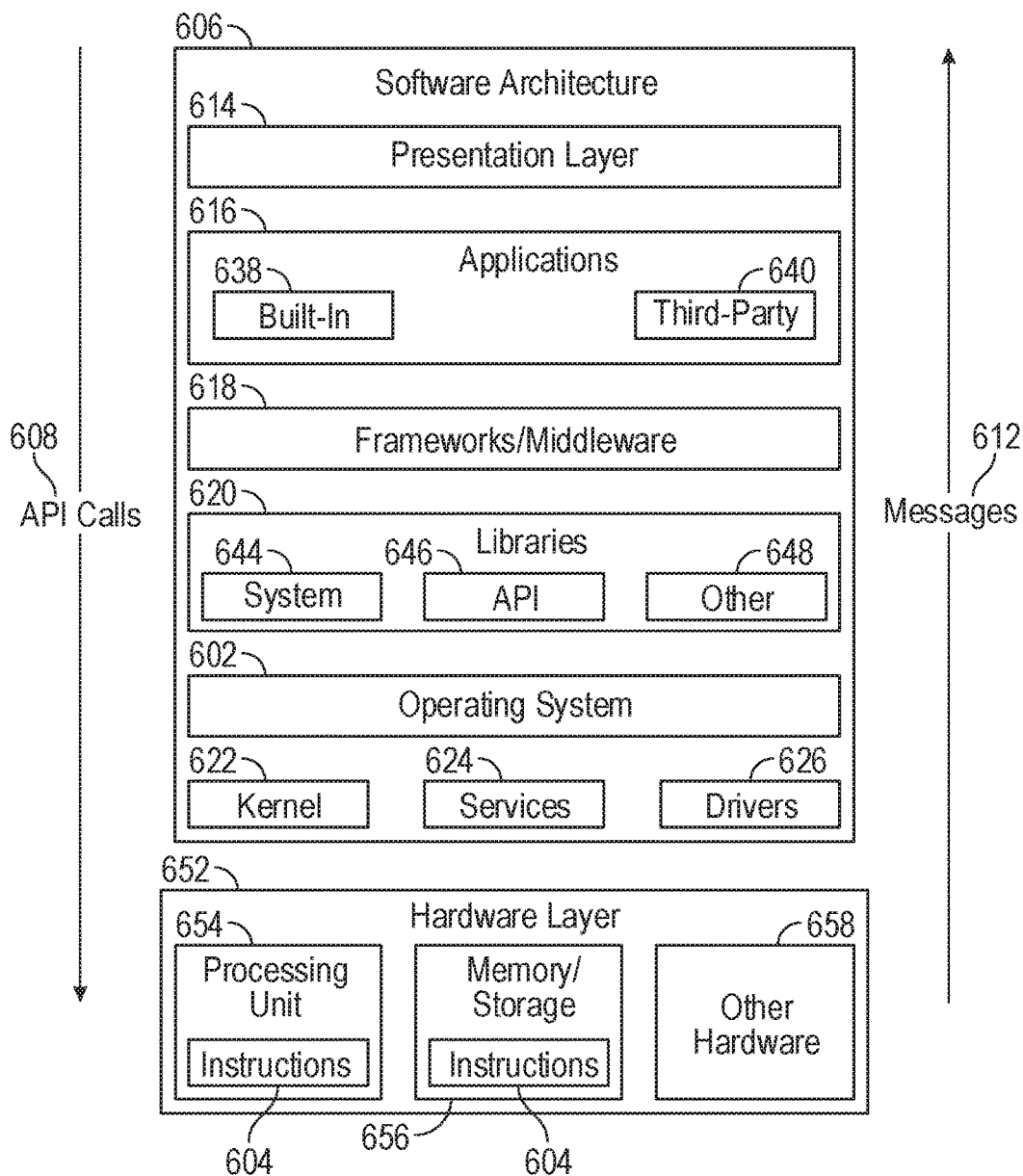
FIG. 6 is a block diagram illustrating a representative software architecture, which may be used in conjunction with various hardware architectures herein described.

FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 620 provide a common infrastructure that is used by the applications 616 or other components or layers. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
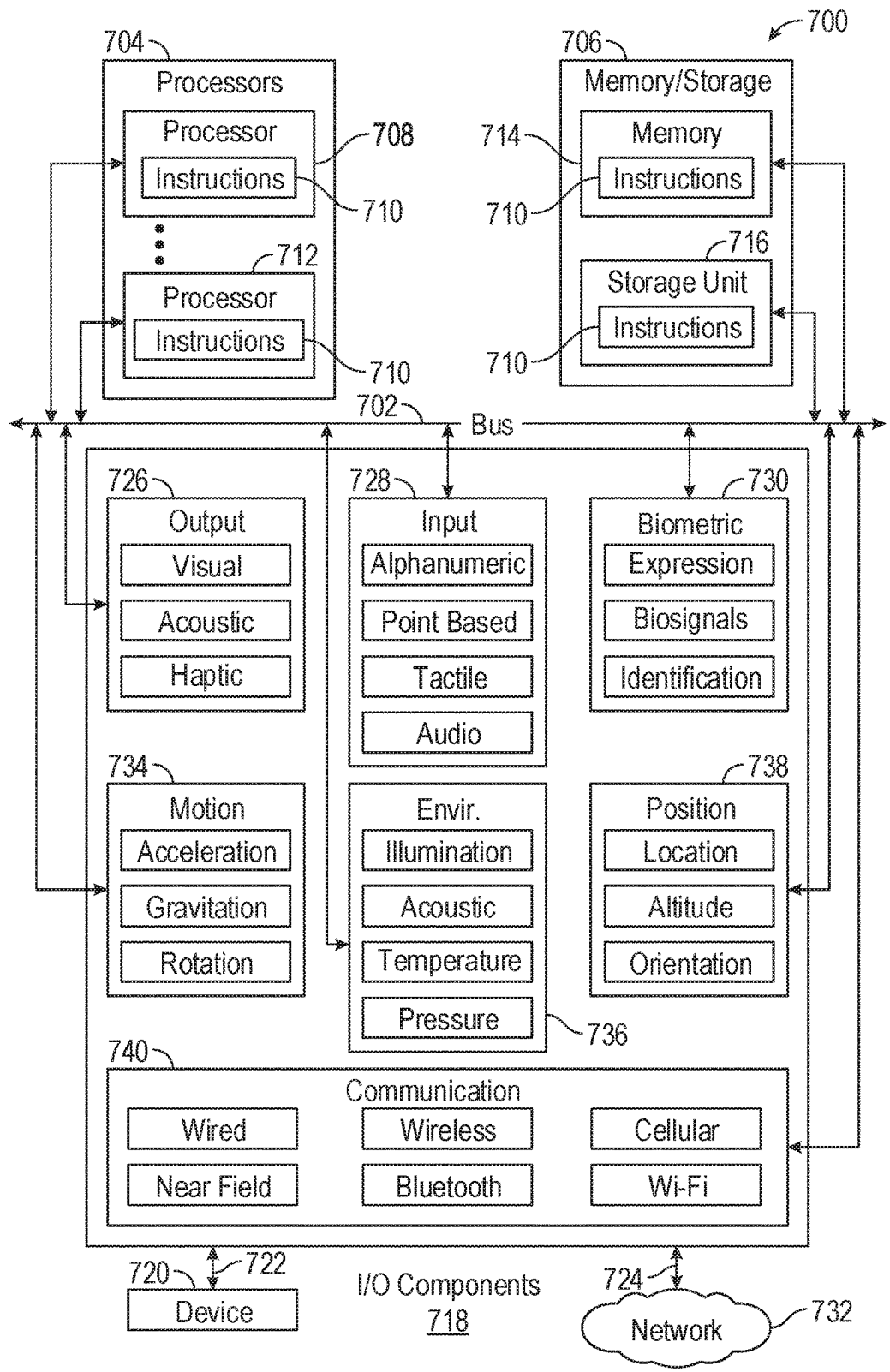
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium." or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components

740 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C." "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B. A and C. B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a processor; and
    memory coupled to the processor and storing instructions that, when executed by the processor, cause the system to perform operations comprising:
        identifying a respective matrix size for each respective computing layer in a plurality of computing layers of a neural network;
        determining a respective time to execute a plurality of software components in conjunction with each respective computing layer having a first matrix size;
        determining a respective time to execute the plurality of software components in conjunction with each respective computing layer having a second matrix size;
        selecting, based on the determined times to execute the plurality of software components in conjunction with each respective computing layer having the first matrix size, a first optimal software component from the plurality of software components to execute for computing layers having the first matrix size; and
        selecting, based on the determined times to execute the plurality of software components in conjunction with each respective computing layer having the second matrix size, a second optimal software component from the plurality of software components to execute for computing layers having the second matrix size.

2. The system of claim 1, wherein the first optimal software component and the second optimal software component are identical.

3. The system of claim 1, wherein the memory further stores instructions for causing the system to perform operations comprising:
    storing information associated with the execution of the plurality of software components in conjunction with the computing layers in a tuning results data structure.

4. The system of claim 3, wherein the tuning results data structure comprises:
    an entry for the first matrix size identifying one or more computing layers having the first matrix size and the first optimal software component to execute for the computing layers having the first matrix size; and
    an entry for the second matrix size identifying one or more computing layers having the second matrix size and the second optimal software component to execute for the computing layers having the second matrix size.

5. The system of claim 3, wherein the memory further stores instructions for causing the system to perform operations comprising:
    retrieving the tuning results data structure; and
    executing a software application using the information stored in the tuning results data structure.

6. The system of claim 5, wherein executing the software application includes:
    executing the software application in conjunction with the first optimal software component for computing layers having the first matrix size; and
    executing the software application in conjunction with the second optimal software component for computing layers having the second matrix size.

7. The system of claim 1, wherein the system repeats, for a predetermined number of executions, the execution of the plurality of the software components in conjunction with the plurality of computing layers, and wherein selection of the first optimal software component and the second optimal software component is further based on the respective times determined for each respective execution in the predetermined number of executions.

8. The system of claim 7, wherein selecting the first optimal software component and the second optimal software component is based on a respective average execution time across the plurality of executions for each respective software component in the plurality of software components.

9. The system of claim 1, wherein the memory further stores instructions for causing the system to perform operations comprising:
    identifying an environmental change associated with the system, the environmental change comprising one or more of: a software change and a hardware change; and
    in response to identifying the environmental change:
        re-determining the respective time to execute a plurality of software components in conjunction with each respective computing layer having the first matrix size;
        re-determining the respective time to execute the plurality of software components in conjunction with each respective computing layer having the second matrix size;

selecting, based on the re-determined times, a third optimal software component from the plurality of software components to execute for computing layers having the first matrix size; and selecting, based on the re-determined times, a fourth optimal software component from the plurality of software components to execute for computing layers having the second matrix size.

10. A method comprising:

identifying, by a computer system, a respective matrix size for each respective computing layer in a plurality of computing layers of a neural network;

determining, by the computer system, a respective time to execute a plurality of software components in conjunction with each respective computing layer having a first matrix size;

determining, by the computer system, a respective time to execute the plurality of software components in conjunction with each respective computing layer having a second matrix size;

selecting, by the computer system based on the determined times to execute the plurality of software components in conjunction with each respective computing layer having the first matrix size, a first optimal software component from the plurality of software components to execute for computing layers having the first matrix size; and selecting, by the computer system based on the determined times to execute the plurality of software components in conjunction with each respective computing layer having the second matrix size, a second optimal software component from the plurality of software components to execute for computing layers having the second matrix size.

11. The method of claim 10, wherein the first optimal software component and the second optimal software component are identical.

12. The method of claim 10, further comprising:

storing information associated with the execution of the plurality of software components in conjunction with the computing layers in a tuning results data structure.

13. The method of claim 12, wherein the tuning results data structure comprises:

an entry for the first matrix size identifying one or more computing layers having the first matrix size and the first optimal software component to execute for the computing layers having the first matrix size; and an entry for the second matrix size identifying one or more computing layers having the second matrix size and the second optimal software component to execute for the computing layers having the second matrix size.

14. The method of claim 12, further comprising:

retrieving the tuning results data structure; and executing a software application using the information stored in the tuning results data structure.

15. The method of claim 14, wherein executing the software application includes:

executing the software application in conjunction with the first optimal software component for computing layers having the first matrix size; and executing the software application in conjunction with the second optimal software component for computing layers having the second matrix size.

16. The method of claim 10, wherein the system repeats, for a predetermined number of executions, the execution of the plurality of the software components in conjunction with the plurality of computing layers, and wherein selection of the first optimal software component and the second optimal software component is further based on the respective times determined for each respective execution in the predetermined number of executions.

17. The method of claim 16, wherein selecting the first optimal software component and the second optimal software component is based on a respective average execution time across the plurality of executions for each respective software component in the plurality of software components.

18. The method of claim 10, further comprising:

identifying an environmental change associated with the system, the environmental change comprising one or more of: a software change and a hardware change; and in response to identifying the environmental change:

re-determining the respective time to execute a plurality of software components in conjunction with each respective computing layer having the first matrix size;

re-determining the respective time to execute the plurality of software components in conjunction with each respective computing layer having the second matrix size;

selecting, based on the re-determined times, a third optimal software component from the plurality of software components to execute for computing layers having the first matrix size; and selecting, based on the re-determined times, a fourth optimal software component from the plurality of software components to execute for computing layers having the second matrix size.

19. A non-transitory computer-readable medium storing instructions that, when executed by a computer system, cause the computer system to perform operations comprising:

identifying a respective matrix size for each respective computing layer in a plurality of computing layers of a neural network;

determining a respective time to execute a plurality of software components in conjunction with each respective computing layer having a first matrix size;

determining a respective time to execute the plurality of software components in conjunction with each respective computing layer having a second matrix size;

selecting, based on the determined times to execute the plurality of software components in conjunction with each respective computing layer having the first matrix size, a first optimal software component from the plurality of software components to execute for computing layers having the first matrix size; and selecting, based on the determined times to execute the plurality of software components in conjunction with each respective computing layer having the second matrix size, a second optimal software component from the plurality of software components to execute for computing layers having the second matrix size.

20. The non-transitory computer-readable medium of claim 19, wherein the medium further stores instructions for causing the computer system to perform operations comprising:

identifying an environmental change associated with the system, the environmental change comprising one or more of: a software change and a hardware change; and in response to identifying the environmental change:

re-determining the respective time to execute a plurality of software components in conjunction with each respective computing layer having the first matrix size;

re-determining the respective time to execute the plurality of software components in conjunction with each respective computing layer having the second matrix size;

selecting, based on the re-determined times, a third optimal software component from the plurality of software components to execute for computing layers having the first matrix size; and selecting, based on the re-determined times, a fourth optimal software component from the plurality of software components to execute for computing layers having the second matrix size.

* * * * *